(12) United States Patent
Shimomura

(10) Patent No.: US 6,432,017 B1
(45) Date of Patent: Aug. 13, 2002

(54) SPROCKET WITH DOG GEAR

(75) Inventor: Mitsuhiko Shimomura, Nagoya (JP)

(73) Assignee: O-Oka Corporation, Aichi-ken (JP)

( * ) Notice: Subject to any disclaimer, the term of this patent is extended or adjusted under 35 U.S.C. 154(b) by 0 days.

(21) Appl. No.: 09/515,465

(22) Filed: Feb. 29, 2000

(30) Foreign Application Priority Data

Apr. 20, 1999 (JP) ........................................... 11-112751

(51) Int. Cl.$^7$ ............................................. F16H 57/04
(52) U.S. Cl. ..................................................... 475/160
(58) Field of Search .................. 474/160, 169, 474/158, 159, 78

(56) References Cited

U.S. PATENT DOCUMENTS 5,860,882 A * 1/1999 Petrilli et al. ............... 474/158

FOREIGN PATENT DOCUMENTS

| DE | 4129149 A | * | 3/1993 |
| EP | 1046441 A2 | * | 3/2000 |
| JP | 2000301281 A | * | 10/2000 |

* cited by examiner

*Primary Examiner*—Dirk Wright
(74) *Attorney, Agent, or Firm*—Pearson & Pearson, LLP

(57) ABSTRACT

To put mass production of a sprocket with dog gear by forging to practical use, a worked product is manufactured by a first step of forming by hot forging means a primary workpiece having a shape comprising the sprocket and the dog gear adjacent to each other; a second step of forming a secondary workpiece having accuracy increased by setting the primary workpiece in a cold forging apparatus; and a third step of forming by cutting means a cut-in groove of a fixed depth perpendicularly to an axial direction in a boundary between a dog gear and a sprocket of the secondary workpiece.

9 Claims, 7 Drawing Sheets

(a)

(b)

(c)

(d)

(e)

(f)

(a)

(b)

SPROCKET WITH DOG GEAR

BACKGROUND OF THE INVENTION

1. Field of the Invention

The invention relates to a sprocket with dog gear comprising a sprocket and a dog gear coaxially, which is exclusively used as the sprocket for a transfer for a four-wheeled vehicle.

2. Description of the Related Art

A sprocket with dog gear is known to be manufactured by a method in which a matrix having no gear tooth is formed by hot forging means and then the respective tooth profiles of the dog gear and the sprocket are cut in the matrix, a method in which the dog gear and the sprocket are separately formed by cutting and then they are combined with each other, or a method in which the matrix having the tooth profile of the dog gear is formed by cold forging means and then the tooth profile of the sprocket is cut in the matrix.

Any conventional method uses cutting means to form the tooth profile of the sprocket and thus has bad productivity, thereby causing an increase in cost.

More particularly, the method in which the sprocket and the dog gear separately formed are combined with each other is provided with a step of combination, thereby causing a further increase in the cost.

Moreover, the following approach is adopted to use the cutting means. When a diameter of the dog gear is larger than that of the sprocket, as illustrated in FIG. 8, a groove 3 is formed in a boundary between a dog gear 1 and a sprocket 2 so as to secure a clearance for a cutting tool in order to avoid interference with the cutting tool, whereby a distance L between an effective portion M of the gear tooth of the sprocket 2 and the dog gear 1 must be increased. Thus, a thickness of the sprocket with dog gear is axially increased.

To use the forging means, it is not necessary to consider the clearance for the cutting tool. Thus, the forging means is suitable for a formation of the sprocket with dog gear with a thickness axially reduced. However, the forging means requires high pressure, thus a heavy load is applied to a die, and consequently the forging means is disadvantageous in the formation of the highly accurate tooth profile.

A forging technique capable of obtaining high accuracy at low pressure and a development of an axially thin product are therefore desired.

SUMMARY OF THE INVENTION

The invention provides a sprocket with dog gear comprising a dog gear and a sprocket coaxially, which is suitable for a reduction in axial thickness and makes it feasible to reduce a pressure for a forging process and to increase accuracy of a product. The sprocket with dog gear is integrally formed by the following steps: a first step of upsetting by hot forging means, thereby forming a rough having a shape comprising the sprocket and the dog gear; and a second step of increasing accuracy of the respective tooth profiles of the dog gear and the sprocket by setting the rough in a cold forging apparatus and drawing the rough by the cold forging apparatus.

A sprocket with dog gear comprising a dog gear and a sprocket having a diameter smaller than the diameter of the dog gear is formed by the following steps: a first step of upsetting by hot forging means, thereby forming a rough having a shape comprising the sprocket and the dog gear; a second step of increasing accuracy of the respective tooth profiles of the dog gear and the sprocket by setting the rough in a cold forging apparatus and drawing the rough by the cold forging apparatus; and a third step of forming by cutting means a cut-in groove of a fixed depth perpendicularly to an axial direction in a boundary between the dog gear and the sprocket.

Desirably, in at least the second step, a ring-shaped concave groove is coaxially formed in the dog gear of the rough in a surface close to the sprocket, a margin for drawing is set in the tooth profile of the sprocket, and an incompletely-drawn portion produced by the margin for drawing can be formed in the concave groove.

Moreover, in the third step, the incompletely-drawn portion can be removed when the cut-in groove is formed.

Furthermore, a distance between the sprocket and the dog gear can be shorter than a clearance for a cutting tool required to form the sprocket.

A sprocket with dog gear, in which a ring-shaped concave groove is coaxially formed in one surface of a sprocket and a dog gear having a diameter smaller than the diameter of the sprocket is located on an inner wall of the concave groove so that the dog gear and the sprocket axially overlap each other, is formed by the following steps: a first step of upsetting by hot forging means, thereby forming a rough having a shape comprising the sprocket and the dog gear; and a second step of increasing accuracy of the respective tooth profiles of the dog gear and the sprocket by setting the rough in a cold forging apparatus and drawing the rough by the cold forging apparatus.

DETAILED DESCRIPTION OF THE PREFERRED EMBODIMENTS

To describe a sprocket with dog gear according to the invention, a product having the dog gear whose diameter is smaller than the diameter of the sprocket will be first described with reference to the accompanying drawings.

Figure 1:
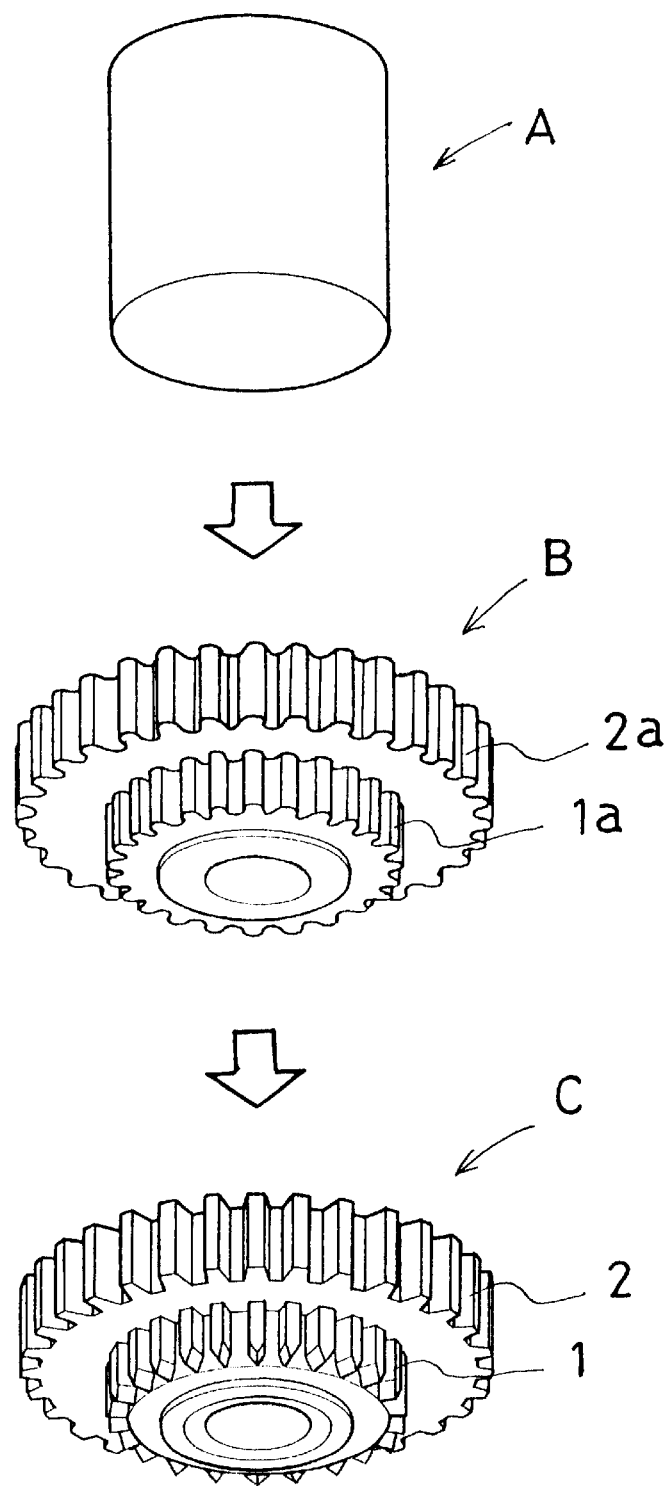
FIGS. 1A, 1B, 1C is an illustration of each step of manufacturing a sprocket with dog gear according to the invention, specifically, a product having the sprocket whose diameter is larger than the diameter of the dog gear.

FIG. 1 shows a shape of work formed in each step. In a first step, i.e., hot forging, a cylindrical material A is formed into a primary workpiece B by upsetting. Specifically, a matrix having double-stacked large and small diameter portions is upset so as to form the primary workpiece B, which is a rough having a dog gear 1a and a sprocket 2a in the small and large diameter portions, respectively. The rough, namely, the primary workpiece B does not yet sufficiently assume the detailed shapes of the respective tooth profiles of the dog gear 1a and the sprocket 2a but has a volume distribution simply matched to the volume distribution of the product.

Then, in a second step, i.e., cold forging, the primary workpiece B is drawn so as to form a secondary workpiece C whose accuracy is increased in details including the respective tooth profiles of a dog gear 1 and a sprocket 2. The secondary workpiece C thus obtained is taken as the product.

In this manner, in the first step, the primary workpiece B (the rough) whose volume distribution is matched to the volume distribution of the product is formed. In the second step, the rough formed in the first step is pressed into a die, whereby the secondary workpiece C is formed by using drawing to increase the accuracy. Thus, this method greatly reduces a pressure to be applied to the die, compared to the method in which the material is formed into the product in a single step by cold forging. Therefore, the respective tooth profiles of the dog gear 1 and the sprocket 2 are formed with high accuracy at the reduced pressure.

Figure 2:
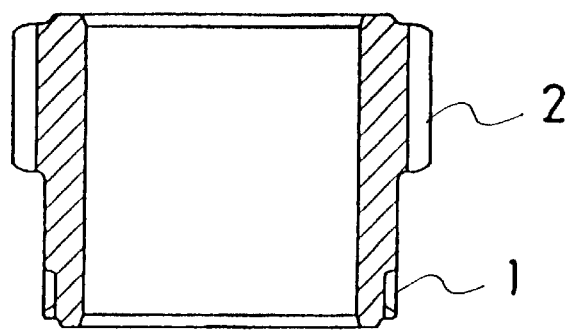
FIGS. 2A, 2B, 2C is an illustration of different types of products having the sprocket whose diameter is larger than the diameter of the dog gear and differing in a distance between the dog gear and the sprocket.
Figure 2:
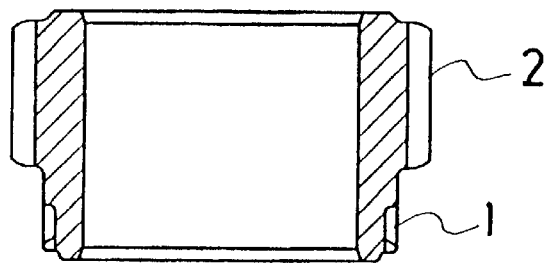
Figure 2:
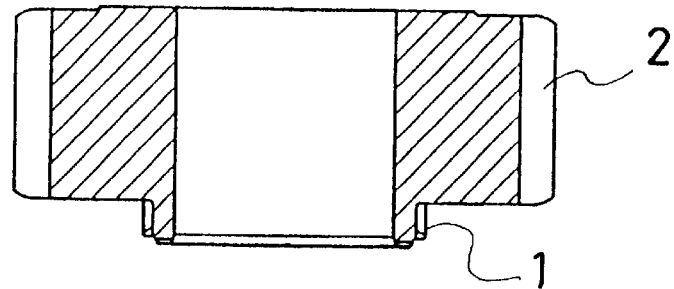

The product formed by this method is considered to be of types as shown in FIG. 2: a type (a) in which the dog gear 1 is separated from the sprocket 2 by a distance equivalent to a clearance for a cutting tool; a type (b) in which the distance required for the clearance for the cutting tool is not secured between the dog gear and the sprocket; a type (c) in which the dog gear is adjacent to and in close contact with the sprocket; and so on.

The types (a) and (b) of these types are suitable for an alternative to the product formed by cutting. However, for the product having the dog gear whose diameter is smaller than the diameter of the sprocket, it is not absolutely necessary to provide the clearance for the tool in a boundary between the dog gear and the sprocket. Thus, the type (c) is not only advantageous in reduction in size of the whole transfer but also greatly increases strength of the dog gear because the root of the dog gear and the matrix have a continuous structure.

Next, the product having the sprocket whose diameter is smaller than the diameter of the dog gear will be described.

In such a form, when a gear tooth of the sprocket and a side surface of the dog gear have the continuous structure, a link plate portion of a chain cannot be engaged with the side surface of the sprocket. Thus, a groove is formed in the boundary between the sprocket and the dog gear, whereby spaces into which the link plate can be inserted must be secured on both the sides of the sprocket.

Figure 3:
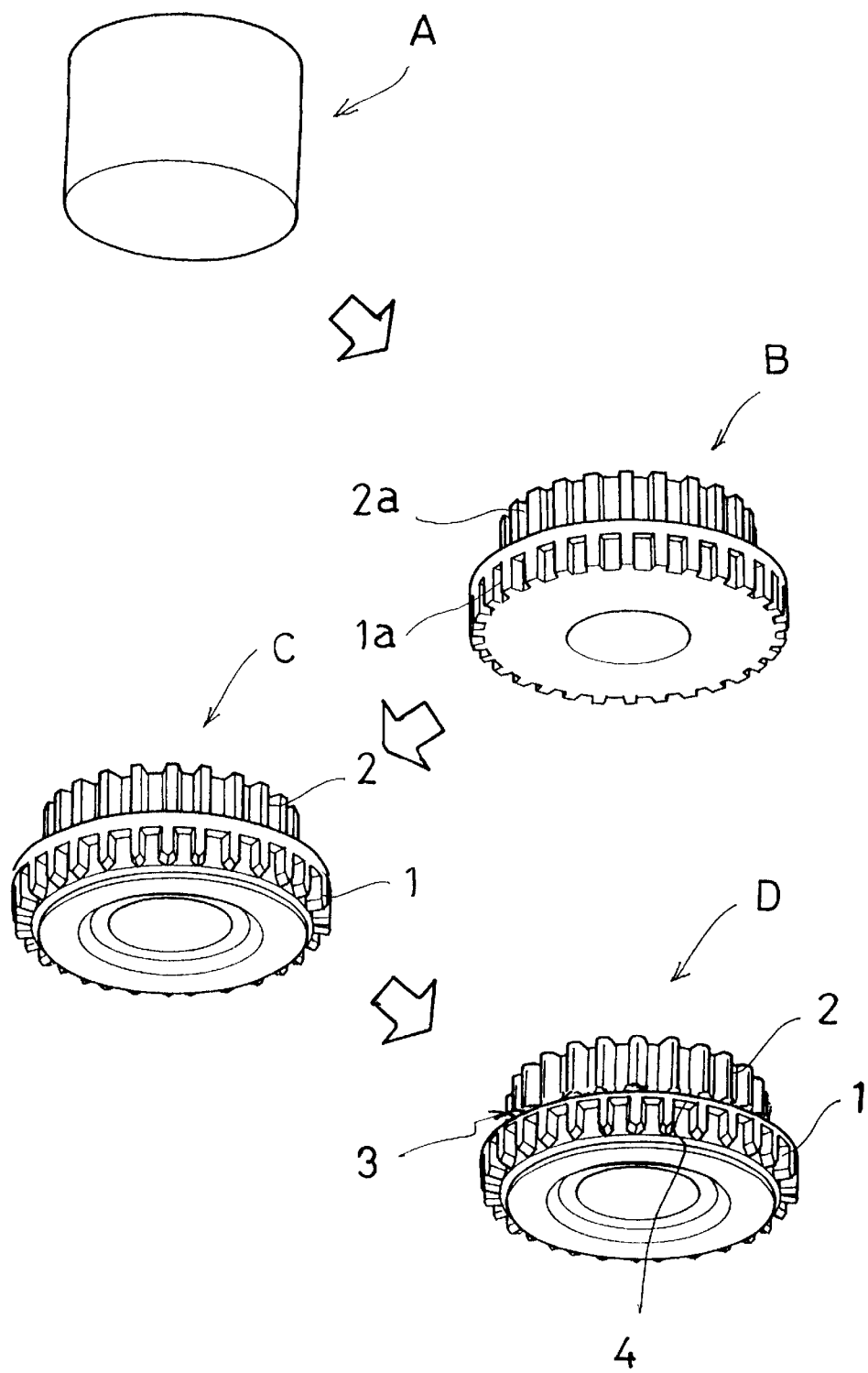
FIGS. 3A, 3B, 3C is an illustration of each step of manufacturing the sprocket with dog gear according to the invention, specifically, the product having the sprocket whose diameter is smaller than the diameter of the dog gear.

Thus, as shown in FIG. 3, in the first step, i.e., hot forging, the cylindrical material A is formed into the primary workpiece B by upsetting. Specifically, the matrix having the double-stacked large and small diameter portions is upset so as to form the primary workpiece B, which is the rough having the dog gear 1a and the sprocket 2a in the large and small diameter portions, respectively. The rough, namely, the primary workpiece B does not yet sufficiently assume the detailed shapes of the respective tooth profiles of the dog gear 1a and the sprocket 2a but has the volume distribution simply matched to the volume distribution of the product. In the second step, i.e., cold forging, the primary workpiece B is drawn so as to form the secondary workpiece C whose accuracy is increased in details including the tooth profiles. Then, in a third step, a groove 3 is cut in the secondary workpiece C, whereby a worked product D is formed.

In this embodiment, a flange 4 is formed adjacent to the dog gear, whereby the tooth profile is strengthened.

Figure 4:
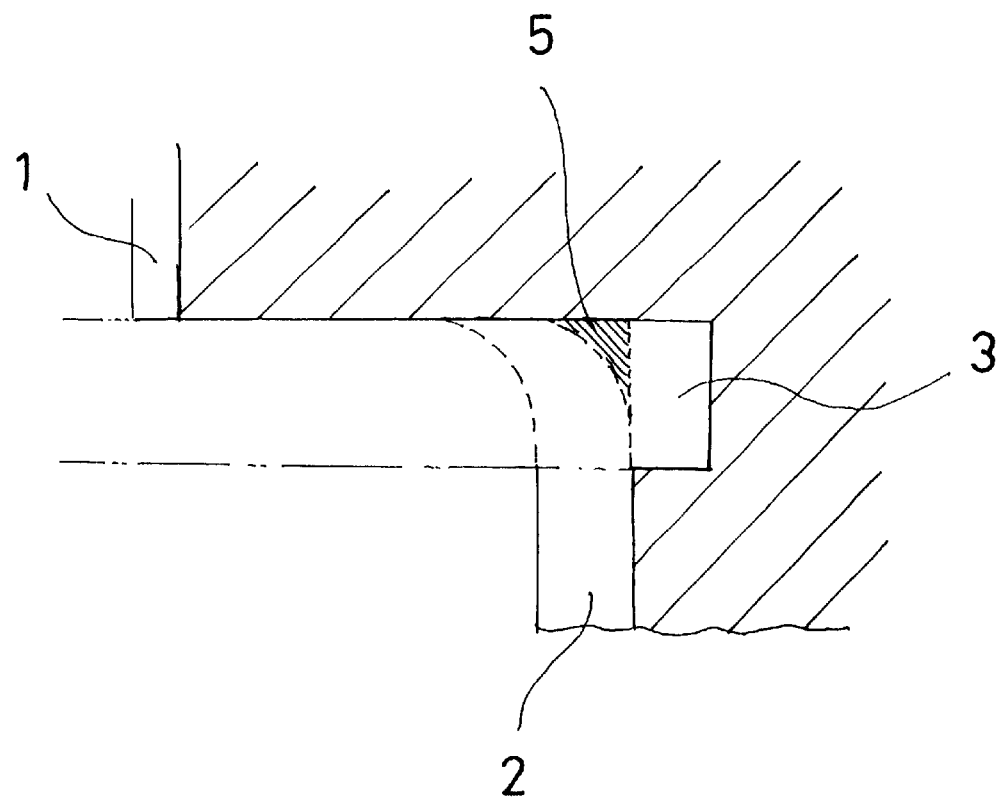
FIGS. 4 is an illustration of a third step in which a not-drawn portion is cut off when a cut-in groove is formed.

A not-drawn portion 5 produced in the boundary between the sprocket and the dog gear is removed by cutting the groove 3 (see FIG. 4).

Thus, in the second step, a margin for drawing is intentionally set in the sprocket, whereby a load to be applied to the die can be reduced. In this case, the not-drawn portion produced is cut off by utilizing grooving.

Figure 5:
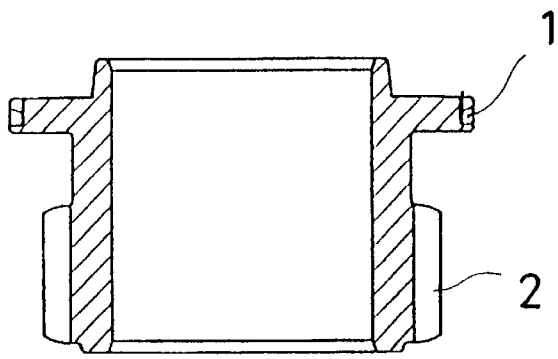
FIGS. 5D, 5E, 5F is an illustration of different types of products having the dog gear whose diameter is larger than the diameter of the sprocket and differing in the distance between the dog gear and the sprocket.
Figure 5:
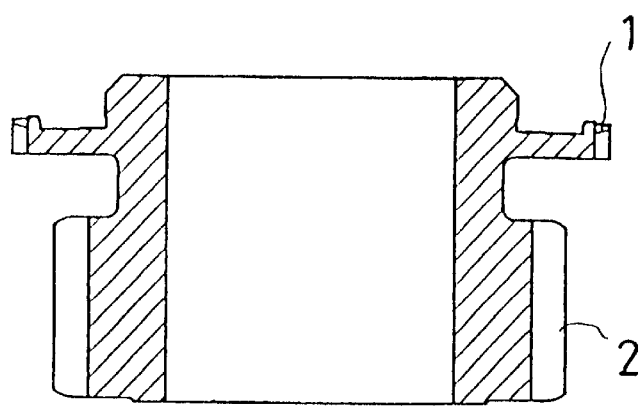
Figure 5:
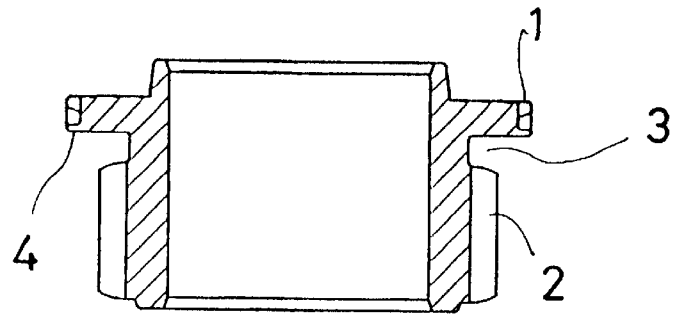

Such a product having the sprocket whose diameter is smaller than the diameter of the dog gear is also considered to be of types (d) to (f) as shown in FIG. 5: the types of the long and short distances between the sprocket 2 and the dog gear 1. Any type can be suitably used for any product and may be used for the product not having the flange 4.

Figure 6:
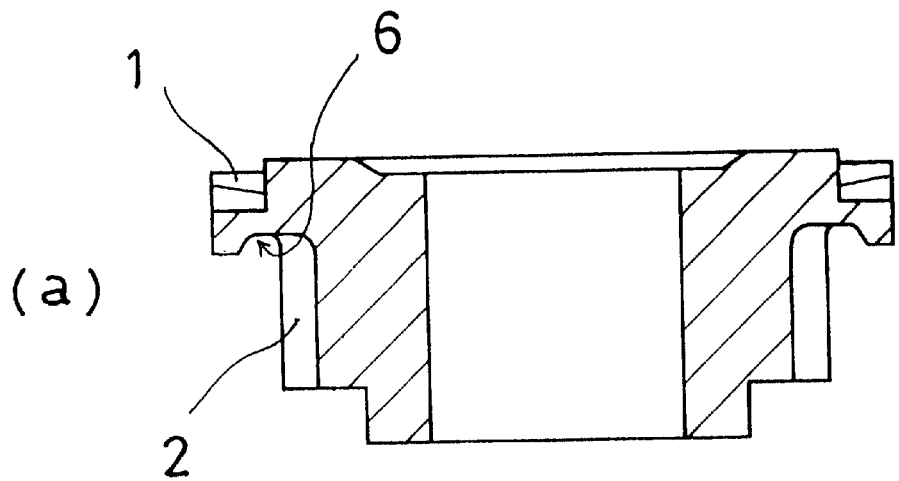
FIGS. 6A, 6B is an illustration of the third step in which the not-drawn portion in a concave groove is completely removed by the third step.
Figure 6:
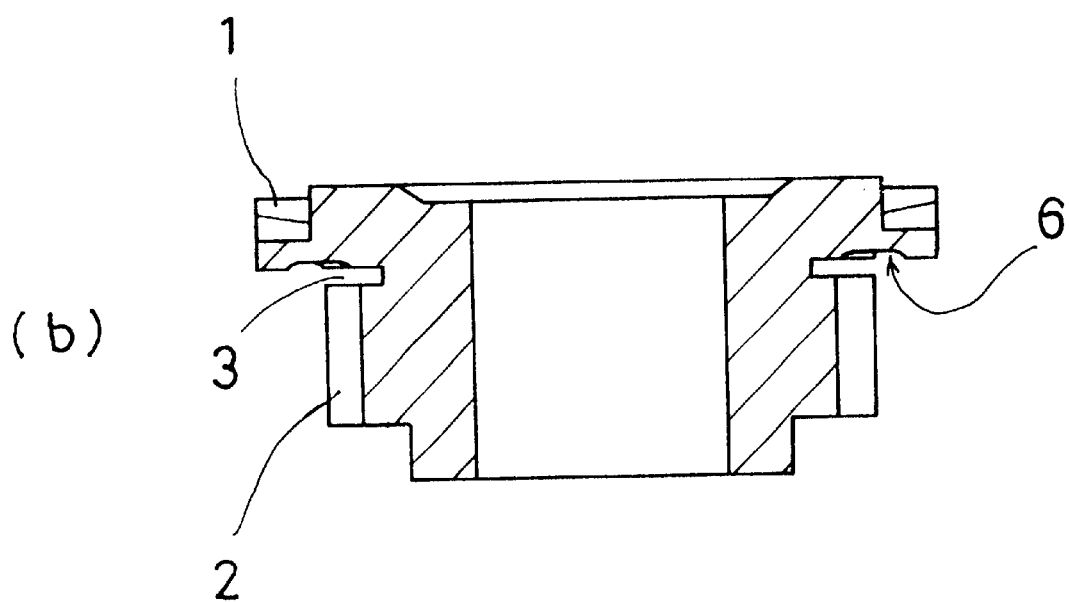

For the product having the sprocket whose diameter is smaller than the diameter of the dog gear, as shown in FIG. 6, a drop-in step 6 is formed in the dog gear 1 in the surface close to the sprocket (FIG. 6A), and then the gear tooth of the sprocket 2 is formed so as to enter into the drop-in step 6. In the third step, the cut-in groove 3 is cut off so as to reach to a bottom surface of the drop-in step 6, whereby a finished product can be obtained (FIG. 6B).

Thus, in a secondary working step, as described above, the tooth profile of the sprocket and the bottom surface of the drop-in step have the continuous structure, and the not-drawn portion is formed only in the drop-in step. Consequently, the not-drawn portion is completely cut off by forming the cut-in groove.

For any of these products, the tooth profile of the dog gear can be reversely tapered, or the product can be lightened by thinning the side surface of the dog gear.

Forging means is adopted, whereby the dog gear can be formed on an inner wall of a concave groove formed in the side surface of the matrix. Next, such an embodiment will be described.

Figure 7:
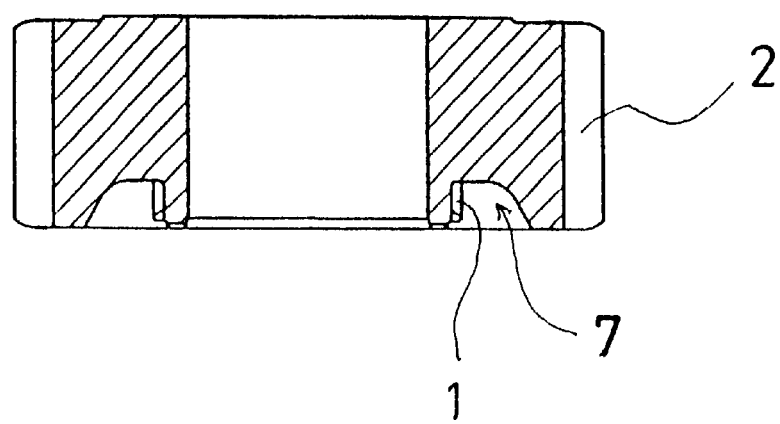
FIG. 7 is an illustration of the product in which the dog gear and the sprocket coaxially overlap each other.
Figure 8:
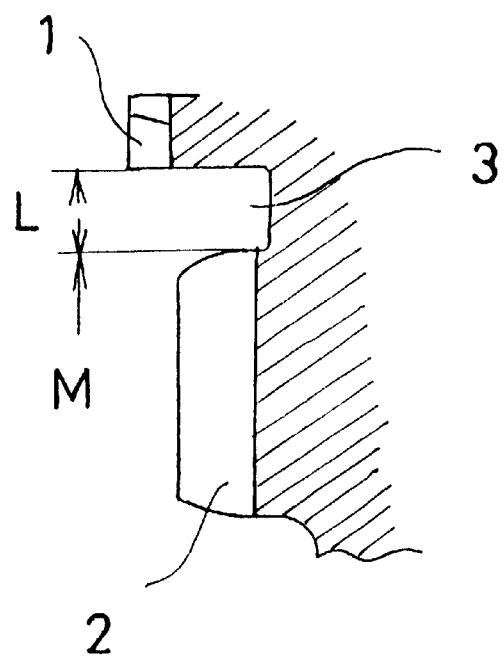
FIG. 8 is an illustration of a need for a clearance for a tool for using cutting means to form the product having the sprocket whose diameter is larger than the diameter of the dog gear.

The sprocket with dog gear shown in FIG. 7, in which a ring-shaped concave groove 7 is coaxially formed in the side surface of the sprocket 2 and the dog gear 1 having the diameter smaller than the diameter of the sprocket 2 is located on the inner wall of the concave groove 7 so that the dog gear 1 and the sprocket 2 axially overlap each other, is manufactured in the following steps. In the first step, the rough having the incomplete tooth profiles of the dog gear and the sprocket is formed. In the second step, the accuracy is increased.

The product having such a shape is further thinned, compared to the product in which the sprocket and the dog gear are axially adjacent to and in close contact with each other.

Thus, the size of the transfer can be minimized.

In the invention, in the first step, the volume distribution of the rough is previously matched to the volume distribution of the product by hot forging tending to have a large amount of deformation. In the second step, i.e., cold forging, drawing is effectively used to increase the accuracy. Thus, the highly accurate sprocket with dog gear can be formed at low pressure, and various types of products having a large diameter or a small diameter, i.e., including the shapes that cannot be formed by cutting can be manufactured. Therefore, a thickness of the product can be minimized.

According to the invention of claim 1, in the first step, the rough is already set so that the volume distribution of the rough may be matched to the volume distribution of the product. Thus, in the second step, i.e., a cold forging step, the amount of deformation is small, thus the load to be applied to the die is reduced, and therefore a longevity of the die is dramatically improved. Moreover, since both of the first and second steps adopt the forging means, it is not necessary to consider the clearance for the tool. Thus, the dog gear and the sprocket are brought close to each other, whereby the product can be axially thinned.

According to the invention of claim 2, the not-drawn portion can be produced in the drop-in step, and thus the not-drawn portion is completely removed by forming the cut-in groove.

Furthermore, according to the invention of claim 3, the not-drawn portion is produced in the drop-in step. Thus, even if a large margin for drawing is set, the not-drawn portion can be removed when the cut-in groove is formed. Moreover, the load to be applied to the die can be reduced.

What is claimed is:

1. A sprocket with dog gear comprising a dog gear and a sprocket coaxially, which is integrally formed by the following steps:
   a first step of upsetting by hot forging means, thereby forming a rough having a shape comprising said sprocket and said dog gear; and
   a second step of increasing accuracy of the respective tooth profiles of said dog gear and said sprocket by setting said rough in a cold forging apparatus and drawing said rough by said cold forging apparatus.

2. A sprocket with dog gear coaxially comprising a dog gear and a sprocket having a diameter smaller than the diameter of said dog gear, which is formed by the following steps:
   a first step of upsetting by hot forging means, thereby forming a rough having a shape comprising said sprocket and said dog gear;
   a second step of increasing accuracy of the respective tooth profiles of said dog gear and said sprocket by setting said rough in a cold forging apparatus and drawing said rough by said cold forging apparatus; and
   a third step of forming by cutting means a cut-in groove of a fixed depth perpendicularly to an axial direction in a boundry between said dog gear and said sprocket.

3. A sprocket with dog gear according to claim 2, wherein in at least said step of setting said rough-shaped sprocket with dog gear in a cold forging apparatus and drawing said rough-shaped sprocket with dog gear through said cold forging apparatus comprises the step of forming a ring-shaped concave groove coaxially in said dog gear of said rough-shaped sprocket with dog gear in a surface close to said sprocket, a margin for drawing being set in the tooth profile of said sprocket, and an incompletely-drawn portion produced by said margin for drawing can be formed in said concave groove.

4. A sprocket with dog gear according to claim 3 wherein said incompletely-drawn portion is removed when said cut-in groove is formed.

5. A sprocket with dog gear according to claim 1, wherein a distance between said sprocket and said dog gear is shorter than a clearance for a cutting tool required to form said sprocket.

6. A sprocket with dog gear in which a ring-shaped concave groove is coaxially formed in one surface of a sprocket, and a dog gear having a diameter smaller than the diameter of said sprocket is located on an inner wall of said concave groove so that said dog gear and said sprocket axially overlap each other, which is formed by the steps of:
   placing a material in a die of a hot forging apparatus to form a rough-shaped sprocket with dog gear; and
   setting said rough-shaped sprocket with dog gear in a cold forging apparatus and drawing said rough-shaped sprocket with dog gear through said cold forging apparatus to increase accuracy of respective tooth profiles of said sprocket with dog gear.

7. A sprocket with dog gear according to claim 2, wherein a distance between said sprocket and said dog gear is shorter than a clearance for a cutting tool required to form said sprocket.

8. A sprocket with dog gear according to claim 3, wherein a distance between said sprocket and said dog gear is shorter than a clearance for a cutting tool required to form said sprocket.

9. A sprocket with dog gear according to claim 4, wherein a distance between said sprocket and said dog gear is shorter than a clearance for a cutting tool required to form said sprocket.

* * * * *